US009900264B1

United States Patent
Chen et al.

(10) Patent No.: US 9,900,264 B1
(45) Date of Patent: Feb. 20, 2018

(54) ADAPTIVE BALANCING OF APPLICATION PROGRAMMING INTERFACE CALLS OF CLOUD TENANTS

(71) Applicant: Red Hat, Inc., Raleigh, NC (US)

(72) Inventors: Huamin Chen, Westford, MA (US); Bradley Dale Childs, Austin, TX (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/402,176

(22) Filed: Jan. 9, 2017

(51) Int. Cl.
| | | |
|---|---|---|
| *G06F 9/54* | (2006.01) | |
| *H04L 12/911* | (2013.01) | |
| *G06Q 30/02* | (2012.01) | |
| *G06N 5/04* | (2006.01) | |
| *H04L 29/06* | (2006.01) | |
| *G06N 7/00* | (2006.01) | |
| *H04L 29/08* | (2006.01) | |

(52) U.S. Cl.
CPC ............ *H04L 47/783* (2013.01); *G06F 9/547* (2013.01); *G06N 5/04* (2013.01); *G06N 7/00* (2013.01); *G06Q 30/0283* (2013.01); *H04L 29/06* (2013.01); *H04L 29/08* (2013.01); *H04L 67/32* (2013.01)

(58) Field of Classification Search
CPC . G06N 5/04; G06N 7/00; H04L 29/06; H04L 29/08; H04L 67/32; H04L 67/42
See application file for complete search history.

(56) References Cited

U.S. PATENT DOCUMENTS

| 9,141,410 | B2 | 9/2015 | Leafe et al. |
| 9,219,669 | B2 | 12/2015 | Morgan |
| 9,391,855 | B2 | 7/2016 | Mouline et al. |
| 2014/0143422 | A1 | 5/2014 | Joseph et al. |
| 2014/0189703 | A1 | 7/2014 | Gilder et al. |
| 2014/0245319 | A1 | 8/2014 | Fellows |

(Continued)

OTHER PUBLICATIONS

Mark Shtern et al., A Runtime Cloud Efficiency Software Quality Metric, http://www.mikesmit.com/wp-content/papercite-data/pdf/nier2014.pdf, May 31-Jun. 7, 2014, York University Toronto, Canada; Dalhousie University Halifax, Canada, 4 pages.

(Continued)

*Primary Examiner* — Chirag R Patel
(74) *Attorney, Agent, or Firm* — Lowenstein Sandler LLP (57) ABSTRACT

A management server may receive a first application programming interface (API) call from a client device, and determine a first API difference value between a revenue resulting from an execution of the first API call and an amount of resources to be involved in the execution of the first API call. The management server may also calculate an average difference value of API calls received from the client device in view of the first API difference value and previous API difference values determined for previous API calls received from the client device. The management server may further determine whether the average difference value satisfies a threshold. In response to determining that the average difference value satisfies the threshold, the management server may allow the API call. In response to determining that the average difference value does not satisfy the threshold, the management server may reject the first API call.

20 Claims, 5 Drawing Sheets

(56) References Cited

U.S. PATENT DOCUMENTS

2015/0295731 A1    10/2015  Bagepalli et al.
2015/0347201 A1*  12/2015  Zhu .......................... G06F 8/74
                                                                         719/328

OTHER PUBLICATIONS

Steve Danielson, Protect your API with Rate Limits using Azure API Managementhttps://azure.microsoft.com/en-in/ documentation/articles/api-management-howto-product-with-rules/, Oct. 25, 2016, 21 pages.

* cited by examiner

ADAPTIVE BALANCING OF APPLICATION PROGRAMMING INTERFACE CALLS OF CLOUD TENANTS

TECHNICAL FIELD

The disclosure relates to providing cloud based services to client devices, and more specifically to balancing application programming interface (API) calls of client devices that use the cloud based services.

BACKGROUND

Cloud computing services can provide information technology (IT) as a service over the Internet or dedicated network, with delivery on demand. Cloud computing services can range from full applications and development platforms, to servers, storage, and virtual desktops. Corporate and government entities can utilize cloud computing services to address a variety of application and infrastructure needs. Cloud computing utilizes server and storage virtualization to allocate/reallocate resources rapidly for one or more client devices. The resources can include virtual resources, such as virtual machines and containers.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Aspects and implementations of the present disclosure provide adaptive balancing of application programming interface (API) calls of cloud tenants in a cloud service provider system. In a cloud environment (also referred to herein as or big data environment or a resource environment), there can be one or more host machines to host multiple virtual resources. The virtual resources can be, for example, containers and/or virtual machines. A container can refer to an isolated set of resources allocated to executing an application and/or process independent from other applications and/or processes. A virtual machine can be a software implementation of a machine (computer) that includes its own operating system (referred to as a guest operating system) and executes application programs.

The containers and/or virtual machines can share hardware resources such as backend storage and processing devices. The cloud environment can include a management server for automating deployment, scaling, and operations of applications, containers, or virtual machines across hosts in the environment. The management server may manage the allocation of resources for a number of tenants and may allocate additional physical and/or virtual resources and/or reduce existing physical and/or virtual resources for cloud tenants as needed. A cloud tenant is referred to a system of an organization, company or an individual user that shares resources of the cloud environment with other such systems. A cloud tenant may include one or more devices (referred to herein as client devices) that interact with the cloud environment and may require more or fewer physical and/or virtual resources in view of these interactions.

The management server may allocate additional resources to a cloud tenant in response to receiving a request from a client device of the cloud tenant. The request may be an API call from the client device. API calls may be issued to check the status of resources allocated to the cloud tenant, request additional or fewer resources or request certain functions to be performed for the cloud tenant, which may result in allocation of additional resources to the cloud tenant.

Responding to a large number of API calls from client devices may reduce the quality of service that can be provided by the cloud environment. Accordingly, in order to ensure the integrity and security of the cloud provider systems, a management server may limit the number of API calls that are allowed for a client device. In traditional systems, the number of API calls may be limited to a certain number within a set amount of time. For example, the number of API calls may be limited to 500 per second. Such a threshold may be set to avoid potential denial of service attacks from a client device or a client device checking the status of cloud resources too frequently.

When a client device exceeds a threshold rate of API calls, the management server may deny additional API calls. For example, the management server may deny all API calls from the client device for a set amount of time. However, such API rate limits may pose problems for cloud tenants. In particular, such limits may result in a reduced quality of service provided by a cloud tenant to its end users.

Such conventional systems typically do not take into account the type of API call that is received by the management server or the type of services used by the client device. Thus, one client device that is making many API calls to add resources may be treated the same as another client device that is frequently checking status of resources allocated to it. However, API calls of the first client device may be essential for proper functionality of the first cloud tenant's system and also beneficial to the cloud service provider because such API calls may generate additional revenue for the cloud service provider, while API calls of the second device may consume more cloud resources without improving the functionality of the second cloud tenant's system and without generating any additional revenue for the cloud service provider.

Implementations of the present disclosure provide adaptive balancing of API calls of cloud tenants based on particular types of APIs. The management server may determine whether executing an API call of a client device may involve additional cloud resources and whether it is likely to generate revenue for the cloud provider (which is indicative of resulting in improved functionality of the cloud tenant's system as well). The difference between the revenue and the cost (e.g., based on amount of additional resources) for executing the API call may be used to determine whether to allow the API call. For instance, the management server may allow API calls that generate a positive difference and reject those that generate a zero or negative difference. In some implementations, the management server may determine an average difference between revenue and costs for a client device using the current API call and previous API calls of the client device. The previous API calls may include all API calls from the client device, a set number of preceding API calls from the client device, or a set of API calls within a set timeframe. If the average difference of the API calls of the client device is above a threshold, then the API call may be allowed. If the average difference of the API calls of the client device is below a threshold, then the API call may be rejected.

The technology discussed herein may be advantageous because it enhances the perceived quality of service of the cloud environment for cloud tenants by adaptively balancing the number of APIs being executed in the cloud environment. Furthermore, the adaptive API rate balancing allows cloud tenants to provide better service for their end users, as compared to traditional API rate balancing schemes that impose predefined limits on API calls regardless of their types, which can negatively impact the performance of cloud tenants.

Figure 1:
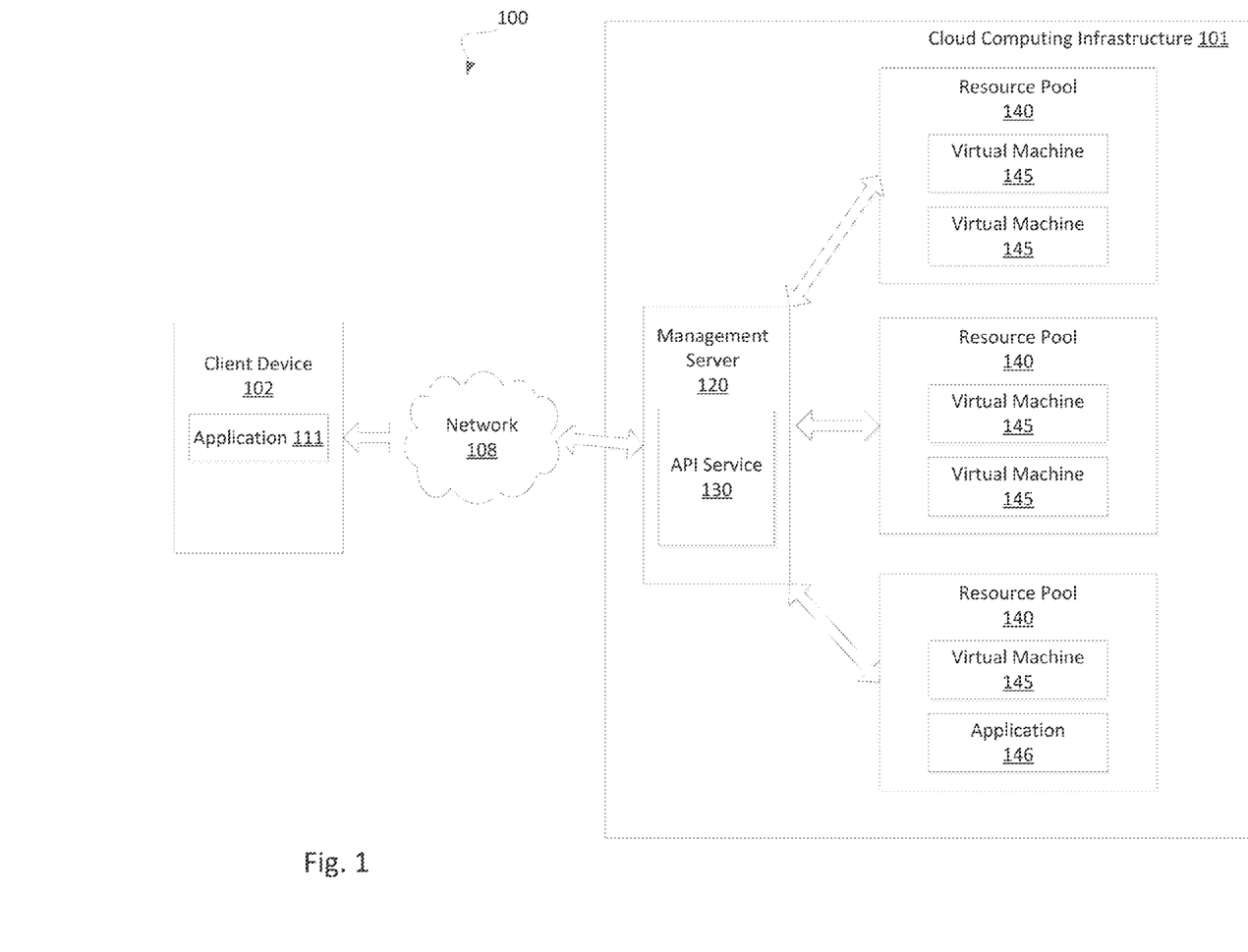
FIG. 1 depicts a block diagram of a cloud computing environment, according to one or more aspects of the present disclosure.

FIG. 1 is an example system architecture 100 for various implementations of the disclosure. The system architecture 100 may include a cloud computing infrastructure 101 coupled to one or more client devices 102 via a network 108. The network 108 may be a public network (e.g., the Internet), a private network (e.g., a local area network (LAN) or wide area network (WAN)), or a combination thereof. The network 108 may include a wireless infrastructure, which may be provided by one or multiple wireless communications systems, such as a wireless fidelity (WiFi) hotspot connected with the network 108 and/or a wireless carrier system that can be implemented using various data processing equipment, communication towers, etc.

The cloud computing infrastructure 101 may include multiple resource pools 140. The resource pools 140 may include physical and virtual resources. For example, the resource pools 140 may include computer storage and processing devices that are made available to one or more client devices 102. The resource pools 140 may further provide access to one or more virtual machines 145 that are hosted by the resource pools 140. In some implementations, the resource pools 140 may further provide access to one or more applications 146 that are hosted by the resource pool 140, or may be hosted by a virtual machine 145. The resource pools 140 may include, but are not limited to, any data processing device, such as a desktop computer, a laptop computer, a mainframe computer, a personal digital assistant, a rack-mount server, a hand-held device or any other device configured to process data. In some implementations, the resource pools 140 may further include mass storage devices, such as magnetic or optical storage based disks, solid-state drives (SSDs) or hard drives, memory such as random access memory (RAM), Flash memory, and the like. Furthermore, the resource pools 140 may provide networking resources such a physical or virtual network interface cards, hosted networking services, or the like. In some implementations, there may be fewer or additional resource pools 140, virtual machines 145, or applications 146. In addition, other physical or virtual resources may be provided by resource pools 140 to a client device 120.

Any number of client systems 102 may include an application 111 that is to use one or more resources from the resource pools 140. The client system 102 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader, or the like. The client machines 102 may host one or more applications 111. An application 111 may be any type of application including, but not limited to, a web application, a desktop application, a browser application, etc. In some implementations, an application 111 may request access to a virtual machine 145 or application 146 in the cloud computing infrastructure 101. For example, the application 111 may request that a new virtual machine 145 be instantiated on the cloud computing infrastructure 101 for access by the client device 102.

The cloud computing infrastructure 101 may include a management server 120 that may include an API service 130. The management server 120 may manage requests of client devices 102 that are accessing the cloud computing infrastructure 101. For example, the management server 120 may manage the resources allocated from resource pools 140 to client devices 102. Thus, the management server 120 may cause new virtual machines to be created, remove unused virtual machines, launch or terminate one or more applications, provide additional hardware resources to a client device 102, or otherwise change the allocation of resources to a client device 102. The management server 120 may change the allocation of resource to a client device 102 based on a request from the client device. For instance, the management service 120 may update the resources allocated to a client device 102 in response to an API call received from the client device 102.

As shown in FIG. 1, the management server 120 may include, as described in further detail below, an API service 130. The API service 130 may determine whether or not to allow execution of an API call from a client device 102. The API service 130 may receive the API call from a client device 102 and determine, based on the revenue that would e result from executing the API call and the resource cost that would result from executing the API call, whether to allow the API call. For example, the API service 130 may determine based on a type of API call a difference between amount of revenue and resource costs that would be generated by an API call. Accordingly, the API service 130 may allow the API call if it is beneficial to the cloud computing infrastructure 101. In some implementations, the API service 130 may use a history of API calls from the client device 102 and a current API call from the client device 102 to determine whether to allow an API call to be executed. For example, the API service 130 may reject an API call from a client device 102 if a moving average difference between the revenue and cost of API calls from the client device 102 is below a threshold.

Figure 2:
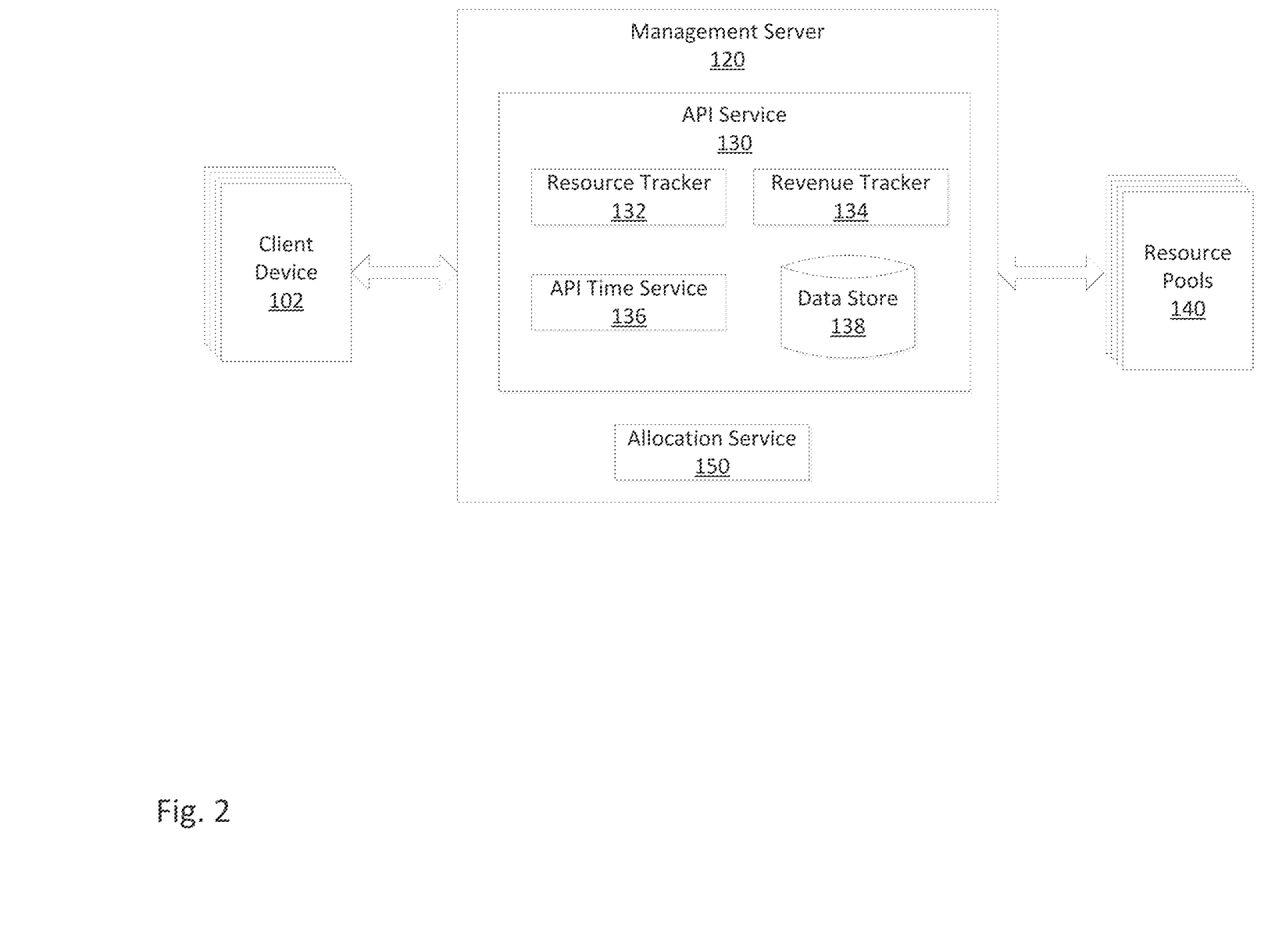
FIG. 2 depicts a block diagram of a management server for determining whether to allow an application programming interface call, according to one or more aspects of the present disclosure.

FIG. 2 is a block diagram of one illustrative example of a management server 120 having an API service 130, in which systems and methods described herein may operate. As discussed with reference to FIG. 1 above, the management server 120 may allocate resources from resource pools 140 to client device 102. For instance the management server 120 may include an allocation service 150 that executes APIs received from client devices 102 in order to update physical or virtual resources allocated from resource pools 140 to client devices 102. The allocation service 150 may further update the allocation of resources to client devices based on the availability of resources, optimizing the utilization of resources, or other parameters.

The API service 130 may determine whether to allow or reject an API call received from a client device 102. The API service 130 may include a resource tracker 132, a revenue tracker 134, an API time service 136, and a data store 138. In some implementations, one or more components of the API service 130 may be combined into a single component or may be subdivided into additional components. Furthermore, the components the API service 130 may include fewer or additional components than are shown in FIG. 2.

The resource tracker 132 may track the resources used by a client device 102. For example, the resource tracker 132 may track the resources that are allocated to the client device 102 from resource pools 140. The resource tracker 132 may also determine an amount of resources that would be allocated to a client device 102 in response to executing an API call received from the client device 102. In some implementations, the resource tracker 132 may determine a number of resources requested by the client device 102. The resource tracker 132 may also determine an amount of resources that would be used to execute an API call based on the type of API call. For example, executing certain types of API calls may allocate additional resources to a client device 102. Accordingly, the resource tracker 132 may determine the amount of additional resources that would be allocated based on the type of API call. In some implementations, the resource tracker 132 may access a data store 138 in order to determine the resources that would be consumed by an API call.

In addition to determining an amount of resources that would be involved in executing an API call, the resource tracker 132 may determine a cost associated with executing the API call. For example, the cost may be related to the amount of a resource that would be used to execute the API call. In some implementations, the resource tracker 132 may determine an amount of a resource that is involved in executing an API call from a client device 102 based on historic data related to the client device 102. For example, if a client device 102 has sent that API call to the management server 102 previously and it resulted in a set amount of resources being involved, then the resource tracker 132 may estimate an amount of resources to be involved in another API call of the same type from the same client device 102 based on the previous amount. For some API types, executing the API call may result in additional resources being used only some of the time. Thus, the resource tracker 132 may determine a probability that the API resource call will result in additional resources being used. For instance, the resource tracker may multiply a calculated probability of additional resources being involved in the execution of an API call by an amount of resources that would be used to determine an estimated amount of resources that would be used. In some implementations, the data store 138 may store a record of previous API calls by a client device 102 that the resource tracker 132 may use to estimate the amount of resources that may be involved in an API call for the client device 102. In some implementations, the resource tracker 132 may use records from multiple client devices 102 in order to generate more accurate estimates of resources utilization for an API call.

In some implementations, the resource tracker 132 may determine the amount of resources involved in executing an API call based on an amount of individual resources in resource pools 140. In some implementations, the resource tracker 132 may represent the amount of resources used as a cost value indicating a cost to a cloud platform for providing the allocated resources. The resource tracker 132 may determine a cost for particular resources based on data stored in data store 138 that correlates an amount of a resource that is used to a cost value for the resource.

The revenue tracker 134 of the API service 130 may determine a revenue associated with an API call received from a client device 102. The revenue tracker 134 may determine the revenue resulting from an API call based on the type of API call received. For example, an API call to instantiate a new virtual machine may result in additional revenue for use of the virtual machine. In some implementations, the revenue tracker 134 may determine a revenue resulting from executing an API call based on the resources used and a pricing model. The amount of resources used may be received from the resource tracker 132 or retrieved from a data store 138 based on the type of API call. The pricing model may be particular to a client device 102, or may apply to a variety of client devices. The pricing model (or models) may be stored in a data store 138 and used by the revenue tracker 134 when determining a revenue resulting from execution of an API call. Other API calls, such as an API call to query the number of virtual machine instances provided by the cloud service provider, may not result in additional revenue. For example if executing the API call does not change the resource utilization for a client device 102, the revenue may be zero based on the pricing model. However, some API calls may not result directly in revenue, but maybe a prerequisite for subsequent API calls that do result in additional revenue. Accordingly, the revenue tracker 134 may determine a probability that an API call will result in future revenue for another API call based on previous API calls of the same type for the client device that sent the API call. Thus, the revenue tracker 134 may indicate that the revenue for the API call is a product of the potential future revenue and the probability of generating additional revenue.

The table below describes revenue and costs associated with an example set of API calls. In a cloud service provider system, many additional types or variations of API calls may be used by a client device 102. Accordingly, the set of API calls described in the table below are for example purposes only.

| API type | Resources Involved | Cost Change | Resulting Revenue |
| --- | --- | --- | --- |
| Query VM instances | Database search | No change | Potential revenue if perquisite to "Create VM" API call |
| Create VM instance | Create VM and Update database | Additional cost | Additional revenue |
| Delete VM instance | Delete VM and Update database | Reduces cost | No additional revenue |
| Describe Storage Volume | Database search | No change | Potential revenue if prerequisite to "Create Volume" API call |
| Create Volume | Create storage and Update database | Additional cost | Additional revenue |
| Delete Volume | Delete storage and Update database | Reduces cost | No additional revenue |

As shown in the table above, different types of API calls may result in different resource utilization, which may change the costs to the cloud service provider. Furthermore, certain API calls may result in additional revenue (e.g., create volume or create virtual machine instance calls), while other API calls may not generate additional revenue (e.g., delete volume or delete virtual machine instance calls). In addition, some API calls may not generate revenue directly, but may result indirectly in additional revenue if it is a prerequisite to a revenue generating API call (e.g., query virtual machine instances or describe storage volume calls).

Based on the information provided by the resource tracker 132 and the revenue tracker 134, the API service 130 may determine whether or not to allow an API call received from a client device 102. In some implementations, the API service 130 may determine whether or not to allow the API call based on the average difference value between the revenue resulting from an execution of the API call and an amount of resources to be involved in the execution of the API call for the client device 102 that sent the API call. The API service 130 may calculate the average as a moving average based on a set number of API calls from the client device 102 prior to the current API call. For example, the data store 138 may store a set of data indicating previous API calls from the client device 102 and a difference value associated with each of the API calls. The API service 130 may then determine an average difference value based on the preceding set number of API calls and the current API call. In some implementations, the API service 130 may generate other average difference such as an exponential moving average of preceding API calls, an average difference over a set period of time, or the like. The API service 130 may also reset the average difference value for a client device 102 at certain times, such as after an API call is rejected, at set time intervals, or at other times.

After calculating an average difference value for a client device 102 based on an API call received from the client device and previous API difference values determined for previous API calls received from the client device, the API service 130 may determine whether the calculated average difference value satisfies a threshold. The threshold may be set as a predetermined value for all client devices 102 or may be set to different values for each client device 102. For example, client devices 102 may have a set threshold value that they subscribe to for the cloud service provider. In addition, some client devices 102 may have different threshold values based on historical API calls from the client device 102, revenue previously resulting from the client device 102, or based on other parameters. Thus, some client devices 102 may have a higher threshold value than other client devices 102. The API service 130 may determine the threshold value for an API call from a client device 102 by a calculation or based on accessing the data store 138, which may include thresholds assigned to particular client devices 102.

In response to determining that the average difference value for a client device 102 satisfies a threshold for the client device 102 after an API call, the API service 130 may allow the API call to be executed. In response to determining that the average difference value for a client device 102 does not satisfy the threshold for the client device 102 after an API call, the API service 130 may reject the API call to be executed. If the API call is allowed, the allocation service 150 may execute instructions based on the API to make the changes or provide the information requested by the API call. If the API call is rejected, the API service 130 may provide a notification to the client device 102 that the API call will not be executed.

In some implementations, the API service 130 may continue to reject API calls from a client device 102 for a set amount of time in response to determining that an average difference threshold was not satisfied. The API time service 136 may track an amount of time that passes after the API service 130 rejects an API call from a client device 102. The amount of time may be sued to determine when the API service 130 will allow an API call from the client device 102.

Thus, if the API service 130 receives an additional call from a client device 102, the API service 130 may access data store 138 and determine that additional API calls from that client device 102 are to be rejected. The API service 130 may update the data store 138 to indicate that API calls may be allowed from the client device 102 again after the API time service 136 indicates that a threshold amount of time has passed. In some implementations, the API service 130 may reject only those calls that bring the average difference value for a client device 102 below a threshold and may not reject additional API calls based on time. The API service 130 may also reject additional API calls based on other criteria. For example, the API service 130 may only reject calls that do not result in revenue during a period of time defined by the API time service 136. The API service 130 may reset an average difference value for a client device 102 after the API time service 136 indicates that the set amount of time has passed since an API call was rejected.

The table below gives an example of a set of API calls resulting in an API service 130 rejecting an API call from a client device 102. In the example, a virtual machine create API call has an API difference value of 1.5. An API service 130 may determine that the virtual machine create API call has an API difference value of 1.5 based on the resulting revenue and the resource cost. For example, a virtual machine create API call may result in a revenue value of 2 and a resource cost value of 0.5. Thus, the difference value for the virtual machine create API call may be 1.5. The API service 130 may access the revenue and resource costs values in a data store 138 or may access an API difference value for the virtual machine create API call directly from the data store 138. The API service 130 may further determine that the virtual machine query has an API difference value of 0.375. The API service 130 may determine the difference value of 0.375 based on the probability that the virtual machine query API call will result in revenue and the amount of revenue that would result if the API call is executed. For example, the API service 130 may determine that the virtual machine query API call has a 25% chance of resulting in a later virtual machine create API call that will generate revenue. The API service may determine the probability based on a past history of API calls for the client device 102, for a number of client device 102, or based on data stored in data store 138. As discussed above, the virtual machine create API call results in a difference value of 1.5, thus the API service 130 may determine that a virtual machine query API call has a difference value 0.375 based on taking 25% of the difference value of 1.5. The example values described are used with the set of 5 example API calls in the table below to illustrate an API service 130 determining whether an API call from a client device 102 satisfies a threshold.

| API call | API type | API difference value | Moving average difference value |
|---|---|---|---|
| 1 | VM Query | 0.375 | — |
| 2 | VM Create | 1.5 | — |
| 3 | VM Query | 0.375 | 0.75 |
| 4 | VM Query | 0.375 | 0.75 |
| 5 | VM Query | 0.375 | 0.375 |

In the example in the table above, a client device 102 provides 5 API calls to a management server 120. The API server 130 may then determine whether to allow each API call from the client device 102. In the example, the API server 130 determines if a moving average difference value of the preceding three API calls is over a threshold difference value of 0.5. The set of API calls may be the first API calls from a client device. Thus, there may be no previous average difference calculated. For example, the API calls may be following a period in which API calls were rejected, when a client device 102 first connected to the cloud service provider, or at another time where an average for the client device 102 is reset.

The first API call in the example is a virtual machine query API call. Thus, the API service determines that the API difference value for the API call is 0.375. The API service may not calculate an average difference for the client device 102 until a threshold number of API calls have been provided. Thus, a client device 102 will not have API calls rejected unless at least a threshold number of API calls have been executed. In some implementations, the threshold number of API calls may be the same as a window of API calls used to calculate a moving average. In some embodiments, a different threshold may be set based on a rate limit for a client device 102.

The second API call in the example is a virtual machine create API call. Thus the API service 130 determines that the API difference value for the API call is 1.5. Similar to the first API call, the API service 130 may not determine an average difference value for the client device 102 because a threshold number of API calls have not been executed for the client device.

The third API call in the example is a virtual machine query API call. Thus, the API service determines that the API difference value for the API call is 0.375. After the third API call from the client device 102, a threshold number of API calls may have been met for the API service 130 to calculate an average difference value for the client device 102. The moving average calculated for the first three API calls is 0.75. Accordingly, the API service 130 determines that the average is above a target threshold difference value of 0.5. Therefore, the API service 130 allows the API call to be executed.

The fourth and fifth API calls in the example are also virtual machine query API calls. After the fourth API call, the API service 130 determines that the moving average difference value is 0.75 and thus allows the API call to be executed. After the fifth API call, the moving average difference value for the client device 102 drops to 0.375. Accordingly, the API service 130 determines that the average difference value is below a threshold value for the client device 102. Therefore, the API service 130 rejects the API call. The API service 130 may then continue to reject API calls from the client device 102 for a set period of time. After the period of time has elapsed, the API service 130 may reset the average difference value for the client device 102 and allow additional API calls based on a calculation of the moving average.

Figure 3:
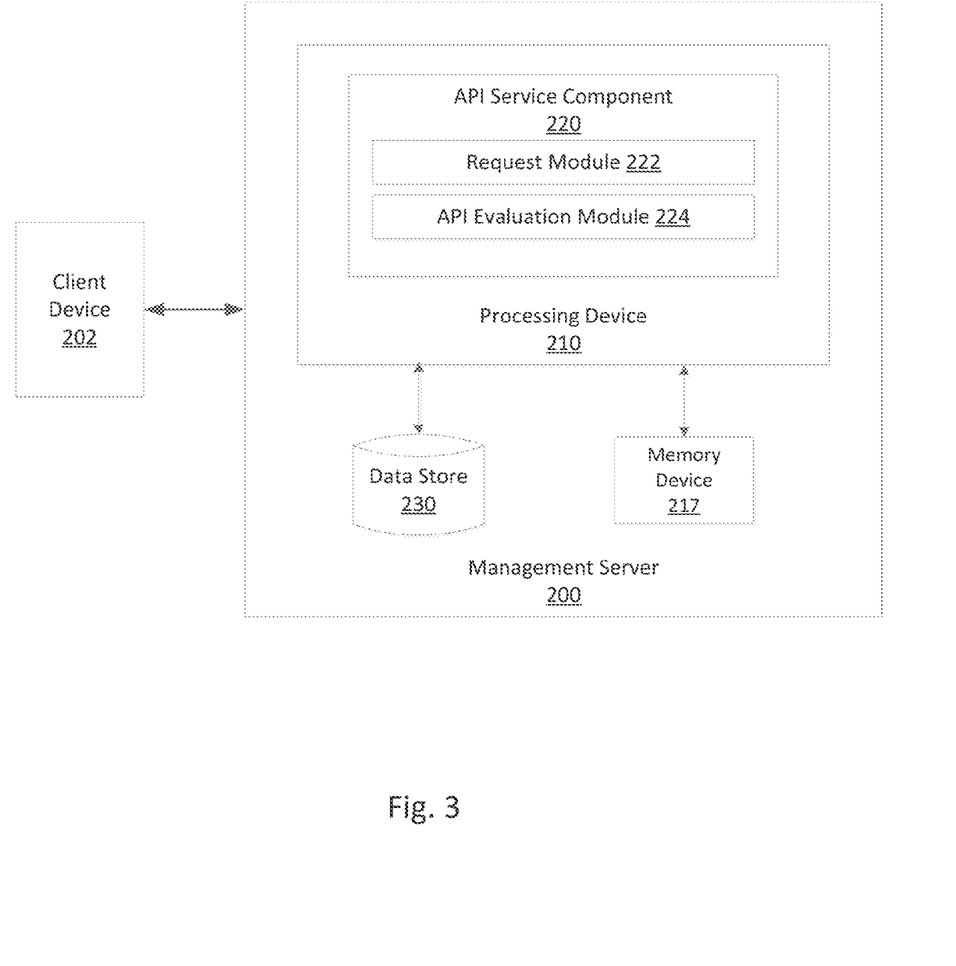
FIG. 3 depicts a block diagram of a management server that provides adaptive balancing of API calls of cloud tenants, according to one or more aspects of the present disclosure.

FIG. 3 is a block diagram of one illustrative example of a management server 200, in which systems and methods described herein may operate. The management server 200 can include a processing device 210 and a memory 217. The processing device 210 may be coupled to memory 217. The memory 217 may include instructions to execute an API service component 220. The processing device 210 can include instructions to execute an API service component 220 including, a request module 222 and an API evaluation module 224 of the API service component 220. The management server 200 may also include a data store 230 that may store a record of previous API calls for the client device 202, parameters regarding the API calls allowed for the client device 202, data regarding revenue resulting from executing API calls, data regarding resources used by executing API calls, or other data for access by the API service component 220.

The management server 200 may receive one or more API calls from a client device 202. The API calls may request information regarding allocated resources in a cloud computing platform, a change to the resources allocated to the client device 202 in the cloud computing platform, or the like. The request module 222 of the API service component 220 may receive the API calls from the client device 202.

The API evaluation module 224 may then determine whether to allow the API call received by the request module 222. For example, the API evaluation module may determine an API difference value between a revenue resulting from an execution of the API call and an amount of resources to be involved in the execution of the first API call in view of the first API type. The API evaluation module may determine the revenue and amount of resources by accessing data store 230 to determine values based on the type of API call that was sent by the client device 202.

The API evaluation module 224 may then calculate an average difference value of API calls received from the client device using the calculated difference value the API call received by the request module 222 and previous difference values of previous API calls received from the client device 202.

The API evaluation module 224 may then determine whether the average difference value satisfies a threshold. For example, the evaluation module 224 may determine a threshold for the client device 202 by accessing a record for the client device 202 in the data store 230. If the average difference value satisfies the threshold, then the API evaluation module 224 may allow the API call. If the average difference value does not satisfy the threshold, the API evaluation module 224 may reject the API call.

Figure 4:
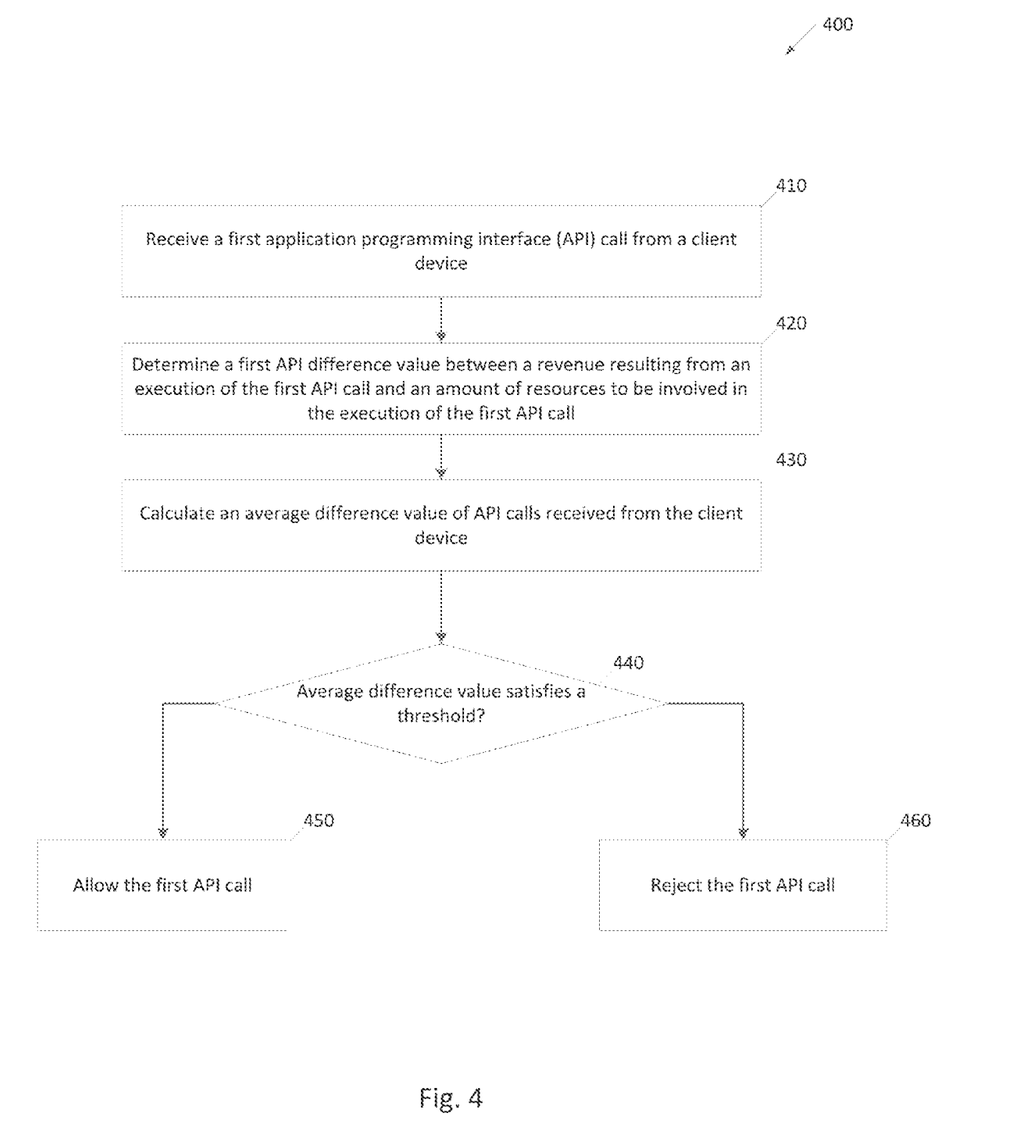
FIG. 4 is a flow diagram of a method for providing adaptive balancing of API calls of cloud tenants, according to one or more aspects of the present disclosure.

FIG. 4 is a flow diagram for a method 400 determining whether to allow an API call from a client device, in accordance with one or more implementations of the present disclosure. Method 300 can be performed by processing logic that can comprise hardware (e.g., circuitry, dedicated logic, programmable logic, microcode, etc.), application program components (e.g., instructions run on a processing device), or a combination thereof. In one implementation, method 300 is performed by an API service (e.g., API service 130 of management server 120 of FIG. 2) or an API service component (e.g., API service component 220 of management server 200 of FIG. 3) executed by a processing device in a computing machine. At least a portion of method 300 can be performed automatically by the computing machine without user interaction.

Beginning in block 410, the management server receives a first application programming interface (API) call from a client device. The API call may request an update to cloud services or resources provided to the client device, or may be a request to provide information to the client device regarding services or resources allocated to the client device or available to the client device.

In block 420, the management server determines an API difference value between a revenue resulting from an execution of the first API call and an amount of resources to be involved in the execution of the first API call. The management server may determine the amount of resources to be used based on resources requested in the API call or based on resources that would be involved in providing a service to the client device. In some implementations, the management server may access a data store to determine an amount of resources based on the type of API call received from the client device. The management server may determine the revenue resulting from executing the API call based on the resources involved in executing the API and a pricing model. In some implementations, the management server may determine the revenue resulting from executing the API call based on data stored in a data store. In some implementations, the management server may determine the difference value between a revenue and an amount of resources based on the type of API call. The management server may also calculate a difference based on a cost associated with the amount of resources and the determined revenue.

In block 430, the management server calculates an average difference value of API calls received from the client device in view of the determined API difference value and previous API difference values that were determined for previous API calls received from the client device. The management server may determine the average over all previous API calls, may calculate a moving average based on a preceding set of API calls, may calculate an exponential weighted moving average based on a previously calculated average and new data from the current API call, or may calculate another average difference value.

In block 440, the management system determines whether the calculated average difference value satisfies a threshold. The threshold may be set for a particular client device or may be set for all client devices. In some implementations, the threshold may be updated based on conditions of the cloud platform. For example, the threshold may be updated to a higher or lower value based on the computing resources available to execute API calls.

If the average difference value satisfies the threshold, then the management server may continue to block 450 and allow the API call. If the average difference value does not satisfy the threshold, then the management server may continue to block 460 and reject the API call.

Figure 5:
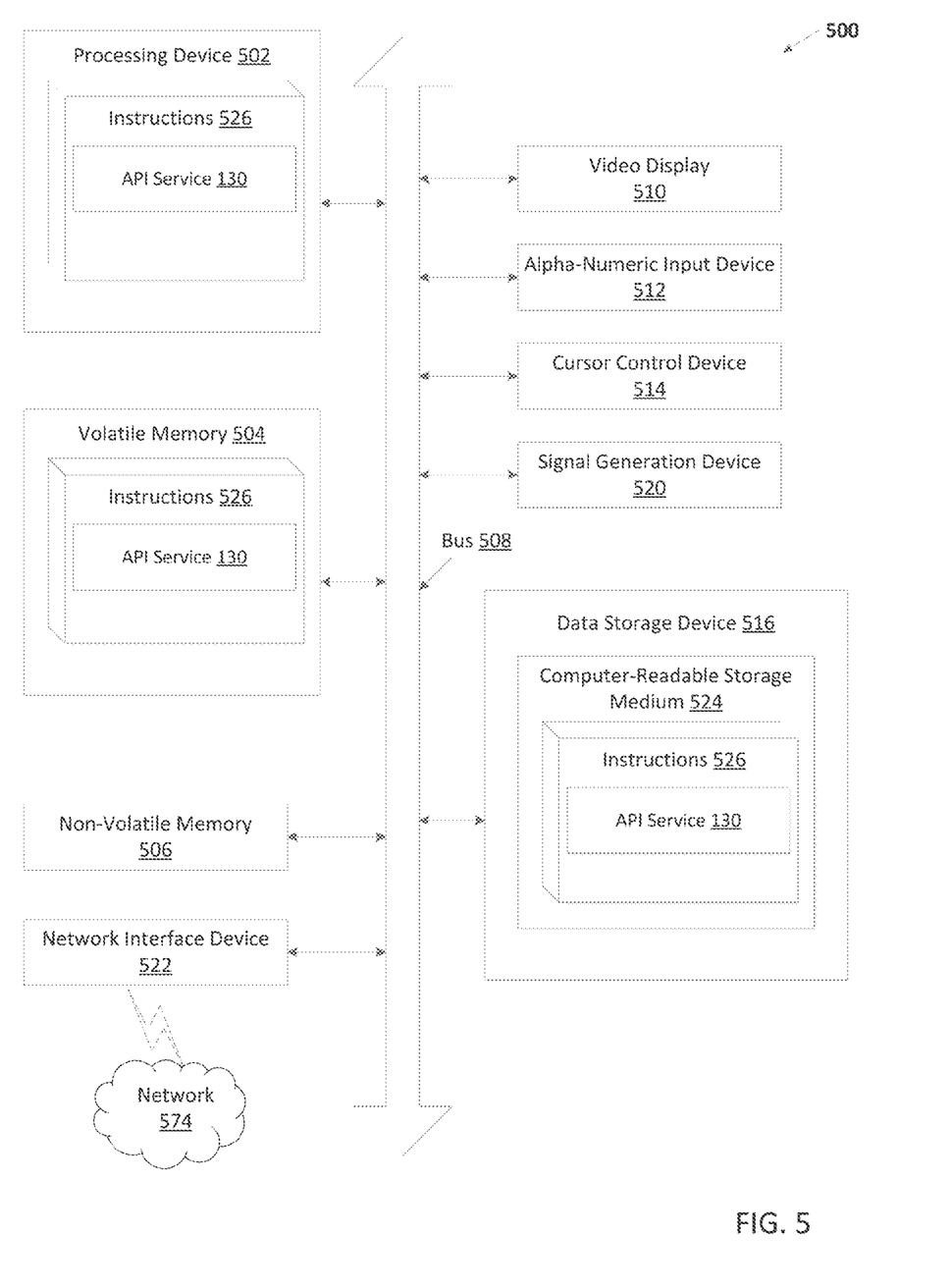
FIG. 5 is a block diagram of an example computer system operating in accordance with one or more aspects of the present disclosure.

FIG. 5 depicts a block diagram of a computer system 500 operating in accordance with one or more aspects of the present disclosure. In various illustrative examples, computer system 500 may correspond to a computing device within system architecture 100 or management server 120 of FIG. 1 or FIG. 2, or management server 200 of FIG. 3. The computer system 500 may be included within a data center that supports virtualization. Virtualization within a data center results in a physical system being virtualized using virtual machines and/or containers to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. A container may be an isolated set of resources allocated to executing an application and/or process independent from other applications and/or processes. This type of virtualization results in multiple VMs and/or containers sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding API Service 130 of FIG. 1 or FIG. 2, API service 222 of FIG. 3, or method 400 of FIG. 4.

Instructions 526 may also reside, completely or partially, within volatile memory 504 and/or within processing device 502 during execution thereof by computer system 500, hence, volatile memory 504 and processing device 502 may also constitute computer-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "resetting," "calculating," "allowing," "determining," "blocking," "assigning," "storing," "rejecting," "updating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and method 400 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processing device of a management server, a first application programming interface (API) call from a client device;
   determining a first API difference value between a revenue resulting from an execution of the first API call and an amount of resources to be involved in the execution of the first API call;
   calculating, by the processing device, an average difference value of API calls received from the client device in view of the first API difference value and previous API difference values determined for previous API calls received from the client device;
   determining, by the processing device, whether the average difference value satisfies a threshold;
   in response to determining that the average difference value satisfies the threshold, allowing the first API call; and
   in response to determining that the average difference value does not satisfy the threshold, rejecting the first API call.

2. The method of claim 1, further comprising:
   receiving a second API call from the client device;
   determining whether a threshold amount of time has passed since the first API call; and
   in response to the threshold amount of time not having passed, rejecting the second API call.

3. The method of claim 1, wherein determining the first API difference value between the revenue resulting from the execution of the first API call and the amount of resources to be involved in the execution of the first API call comprises:
   identifying a type of API call for the first API call; and
   determining the revenue resulting from the execution of the first API call based on data in a data store indicating revenues resulting from different types of API calls.

4. The method of claim 3, wherein determining the revenue resulting from the execution of the first API call further comprises:
   determining a probability of the first API call leading to a potential future revenue; and
   calculating the revenue based on the potential future revenue and the probability of the first API call leading to the potential future revenue.

5. The method of claim 4, wherein determining the probability of the API call leading to the potential future revenue comprises:
   determining a number of API calls of a same type previously received from the client device;
   identify a subset of the of API calls that generated revenue; and
   calculating the probability of the first API leading to the potential future revenue in view of the identified subset of the API calls and the number of API calls of the same type.

6. The method of claim 1, further comprising providing, to the client device, a notification that the first API call was rejected.

7. The method of claim 1, further comprising:
   determining that a threshold period of time has elapsed since the first API was received; and
   resetting the average revenue of API calls received from the client device.

8. The method of claim 1, wherein the first API call is a request to update the configuration of a virtual machine.

9. An apparatus comprising:
   a memory device; and
   a processing device coupled to the memory device, the processing device to:
   receive a first application programming interface (API) call from a client device, wherein the first API call has a first API type;
   determine a first API difference value between a revenue resulting from an execution of the first API call and an amount of resources to be involved in the execution of the first API call in view of the first API type;
   calculate an average difference value of API calls received from the client device in view of the difference value of the first API call and previous difference values of previous API calls received from the client device; and
   compare the average difference value with a threshold to determine whether the API call is to be rejected or allowed.

10. The apparatus of claim 9, wherein the processing device is further to:
    receive a second API call from the client device;
    determine whether a threshold amount of time has passed since the first API call; and
    in response to the threshold amount of time not having passed, reject the second API call.

11. The apparatus of claim 9, wherein to determine the first API difference value between the revenue resulting from the execution of the first API call and the amount of resources to be involved in the execution of the first API call, the processing device is further to:
  determine the revenue resulting from the execution of the first API call based on data in a data store indicating revenues resulting from different types of API calls.

12. The apparatus of claim 11, wherein to determine the revenue resulting from the execution of the first API call, the processing device is further to:
  determine a probability of the first API call leading to a potential future revenue; and
  calculating the revenue based on the potential future revenue and the probability of the first API call leading to the potential future revenue.

13. The apparatus of claim 12, wherein to determine the probability of the API call leading to the potential future revenue, the processing device is further to:
  determine a number of API calls of a same type previously received from the client device;
  identify a subset of the of API calls that generated revenue; and
  calculate the probability of the first API leading to the potential future revenue in view of the identified subset of the API calls and the number of API calls of the same type.

14. The apparatus of claim 9, wherein the processing device is further to:
  determine that a threshold period of time has elapsed since the first API was received; and
  reset the average revenue of API calls received from the client device.

15. The apparatus of claim 9, wherein the first API call is a request to update the configuration of a virtual machine.

16. A non-transitory computer readable medium, having instructions encoded thereon that when executed by a processing device cause the processing device to:
  receive a first application programming interface (API) call from a client device, wherein the first API call has a first API type;
  determine a first API difference value between a revenue resulting from execution of the first API call and an amount of resources to be involved in the execution of the first API call in view of the first API type;
  generate an average difference value of API calls received from the client device in view of the first API difference value and previous API difference values associated with previous API calls received from the client device;
  determine that the average difference value does satisfies a threshold; and
  in response to the average difference value satisfying the threshold, allowing the API call.

17. The apparatus of claim 16, wherein the instructions further cause the processing device to:
  receive a second API call from the client device;
  determine whether a threshold amount of time has passed since the first API call; and
  in response to the threshold amount of time not having passed, rejecting the second API call.

18. The apparatus of claim 16, wherein to determine the first API difference value between the revenue resulting from the execution of the first API call and the amount of resources to be involved in the execution of the first API call, the instructions further cause the processing device to:
  identify a type of API call for the first API call; and
  determine the revenue resulting from the execution of the first API call based on data in a data store indicating revenues resulting from different types of API calls.

19. The apparatus of claim 16, wherein to determine the revenue resulting from the execution of the first API call, the instructions further cause the processing device to:
  determine a probability of the first API call leading to a potential future revenue; and
  calculate the revenue based on the potential future revenue and the probability of the first API call leading to the potential future revenue.

20. The apparatus of claim 19, wherein to determine the probability of the API call leading to the potential future revenue, the instructions further cause the processing device to:
  determine a number of API calls of a same type previously received from the client device;
  identify a subset of the of API calls that generated revenue; and
  calculate the probability of the first API leading to the potential future revenue in view of the identified subset of the API calls and the number of API calls of the same type.

* * * * *